(12) United States Patent
Hu et al.

(10) Patent No.: US 10,871,188 B2
(45) Date of Patent: Dec. 22, 2020

(54) CONTROL METHOD AND CONTROL DEVICE FOR MAGNETIC BEARING

(71) Applicant: Gree Green Refrigeration Technology Center Co., Ltd of Zhuhai, Guangdong (CN)

(72) Inventors: Daofu Hu, Guangdong (CN); Yusheng Hu, Guangdong (CN); Weilin Guo, Guangdong (CN); Yongling He, Guangdong (CN); Bin Yang, Guangdong (CN); Xue Li, Guangdong (CN)

(73) Assignee: GREE GREEN REFRIGERATION TECHNOLOGY CENTER CO., LTD OF ZHUHAI, Guangdong (CN)

(*) Notice: Subject to any disclaimer, the term of this patent is extended or adjusted under 35 U.S.C. 154(b) by 358 days.

(21) Appl. No.: 15/574,964

(22) PCT Filed: May 27, 2016

(86) PCT No.: PCT/CN2016/083588
§ 371 (c)(1),
(2) Date: Nov. 17, 2017

(87) PCT Pub. No.: WO2016/188461
PCT Pub. Date: Dec. 1, 2016

(65) Prior Publication Data
US 2018/0172072 A1 Jun. 21, 2018

(30) Foreign Application Priority Data
May 27, 2015 (CN) .......................... 2015 1 0278938
Jan. 29, 2016 (CN) .......................... 2016 1 0064830

(51) Int. Cl.
*H02K 7/09* (2006.01)
*F16C 32/04* (2006.01)
*F16C 39/06* (2006.01)

(52) U.S. Cl.
CPC ...... *F16C 32/0444* (2013.01); *F16C 32/0442* (2013.01); *F16C 32/0451* (2013.01);
(Continued)

(58) Field of Classification Search
CPC ........................................................ H02K 7/09
See application file for complete search history.

(56) References Cited

U.S. PATENT DOCUMENTS

| 4,065,189 A * | 12/1977 | Sikorra ............... F16C 32/0446 310/90.5 |
| 5,530,306 A | 6/1996 | Ueyama |
| 6,770,146 B2 * | 8/2004 | Koren ..................... B05C 11/08 118/500 |

FOREIGN PATENT DOCUMENTS

| CN | 101483017 | 7/2009 |
| CN | 102072251 | 5/2011 |

(Continued)

*Primary Examiner* — Dang D Le
(74) *Attorney, Agent, or Firm* — Brandon V. Zuniga; James R. Gourley; Carstens & Cahoon, LLP

(57) ABSTRACT

A control method for a magnetic bearing includes following steps: acquiring a suspension stopping instruction for the magnetic bearing, and respectively applying a control current to one or more control coils of the magnetic bearing to subject a rotor to a vertically or obliquely upwards electromagnetic force, a vertical component of the electromagnetic force is less than the gravity of the rotor. A control device for a magnetic bearing is also disclosed, including a suspension stopping instruction acquiring unit and a control current applying unit. The control method and control device for a magnetic bearing can control a falling velocity of the rotor (Continued)

to be lower than that of the rotor being subjected only to the gravity, and have higher control efficiency.

18 Claims, 2 Drawing Sheets

(52) U.S. Cl.
CPC ...... *F16C 32/0453* (2013.01); *F16C 32/0457* (2013.01); *F16C 39/06* (2013.01); *H02K 7/09* (2013.01)

(56) References Cited

FOREIGN PATENT DOCUMENTS

| | | |
|---|---|---|
| CN | 103489356 | 1/2014 |
| CN | 105041869 | 11/2015 |

* cited by examiner

CONTROL METHOD AND CONTROL DEVICE FOR MAGNETIC BEARING

CROSS REFERENCE TO RELATED APPLICATIONS

This application claims the benefits of priority of Chinese Patent Application No. 201510278938.4, filed on May 27, 2015, entitled "Control Method and Control Device for Magnetic Bearing", and Chinese Patent Application No. 201610064830.X, filed on Jan. 29, 2016, entitled "Control Method and Control Device for Magnetic Bearing", the entire contents of which are incorporated herein by reference. This application is a continuation under 35 U.S.C. § 120 of international patent application PCT/CN2016/083588 filed on May 27, 2016, the content of which is also hereby incorporated by reference.

TECHNICAL FIELD

The present disclosure relates to the field of magnetic suspension, and more particularly, to a control method and a control device for a magnetic bearing.

BACKGROUND

A rotor of a magnetic bearing remains in a suspension state during steady operations. Currently, when it is required to stop suspension of the magnetic bearing, a usual way is to directly cut off currents to allow the rotor to fall. In this case, the rotor would directly fall onto the lowermost end of a protection bearing by gravity. In case the rotor of the magnetic suspension system has a relatively high mass, the protection bearing may be prone to crack due to the shock, thereby greatly affecting reliability of the magnetic suspension system.

The prior art disclosed a method for reducing the impact during a suspension stopping process, so as to generate an electromagnetic force required to control the position of the rotor, thereby allowing the rotor to fall slowly. Since the position of the rotor is needed to be obtained in real time, control efficiency of the method is lower.

SUMMARY

In view of this, it is necessary to provide a control method for a magnetic bearing to solve the problem of low control efficiency.

A control method for a magnetic bearing includes following steps:

acquiring a suspension stopping instruction for the magnetic bearing, applying a control current to a control coil of the magnetic bearing to subject a rotor of the magnetic bearing to a vertically or obliquely upwards electromagnetic force, a vertical component of the electromagnetic force is less than the gravity of the rotor.

In one embodiment, the control current is gradually decreased.

In one embodiment, a value of each control current $I_x$ is calculated based on an equation $I_x = P_x \times S + i_x$ until the value of each control current $I_x$ is zero;

wherein $P_x$ is a slope coefficient of switching each control current $I_x$, $P_x = (0 - i_x)/A$, $i_x$ is an initial value of each control current $I_x$, A is a number of switching times of each control current $I_x$, S is a number of iterations and has an initial value of zero, each control current $I_x$ is switched for every period T, a value of a period timer is n with an initial value of zero, and n is continuously accumulated, when n<T, then S remains constant, when n=T, then S=S+1 and n is cleared, x is an integer greater than or equal to 1.

In one embodiment, the control currents are applied to two control coils of the magnetic bearing, respectively; the two control coils are a first control coil and a second control coil, the first control coil and the second control coil are symmetrical with respect to the vertical line passing through the shaft center of the rotor.

The control current applied to the first control coil subjects the rotor to a first electromagnetic force, the control current applied to the second control coil subjects the rotor to a second electromagnetic force, a resultant force of the first electromagnetic force and the second electromagnetic force is the electromagnetic force.

In one embodiment, the control currents applied to the first control coil and the second control coil have the same magnitude.

The present disclosure further provides a control device for a magnetic bearing, including a suspension stopping instruction acquiring unit and a control current applying unit;

the suspension stopping instruction acquiring unit is configured to acquire a suspension stopping instruction for the magnetic bearing;

the control current applying unit is configured to respectively apply a control current to one or more control coils of the magnetic bearing to subject a rotor of the magnetic bearing to a vertically or obliquely upwards electromagnetic force, a vertical component of the electromagnetic force is less than the gravity of the rotor.

In one embodiment, the control current is gradually decreased.

In one embodiment, the control device for a magnetic bearing further includes a control current calculating unit. The control current calculating unit is configured to calculate desired control current and send calculation results to the control current applying unit, the control current applying unit is configured to apply the control current to the one or more control coils of the magnetic bearing according to the calculation results.

The control current calculating unit is configured to calculate a value of each control current $I_x$ based on an equation $I_x = P_x \times S + i_x$ until the value of each control current $I_x$ is zero.

Wherein $P_x$ is a slope coefficient of switching each control current $I_x$, $P_x = (0 - i_x)/A$, $i_x$ is an initial value of each control current $I_x$, A is a number of switching times of each control current $I_x$, S is a number of iterations and has an initial value of zero, each control current $I_x$ is switched for every period T, a value of a period timer is n with an initial value of zero, and n is continuously accumulated, when n<T, then S remains constant, when n=T, then S=S+1 and n is cleared, x is an integer greater than or equal to 1.

In one embodiment, the control currents are applied to two control coils of the magnetic bearing, respectively, the two control coils are a first control coil and a second control coil, the first control coil and the second control coil are symmetrical with respect to the vertical line passing through the shaft center of the rotor.

The control current applied to the first control coil subjects the rotor to a first electromagnetic force, the control current applied to the second control coil subjects the rotor to a second electromagnetic force, a resultant force of the first electromagnetic force and second electromagnetic force is the electromagnetic force.

In one embodiment, the control currents applied to the first control coil and the second control coil have the same magnitude.

The above control method and control device for a magnetic bearing apply a control current to one or more control coils of the magnetic bearing, respectively, to subject the rotor to the electromagnetic force, the vertical component of the electromagnetic force can balance part of the gravity of the rotor, thus a falling velocity of the rotor is lower than that of the rotor being subjected only to the gravity, the impact of the rotor on the protection bearing can be reduced, and the control efficiency is higher.

DETAILED DESCRIPTION OF DISCLOSED EMBODIMENTS

In order to make the purposes, technical solutions and advantages of the present disclosure to be understood more clearly, the present disclosure will be described in further details with the accompanying drawings and the following embodiments. It should be understood that the specific embodiments described herein are merely examples to illustrate the present disclosure, not to limit the present disclosure.

Figure 1:
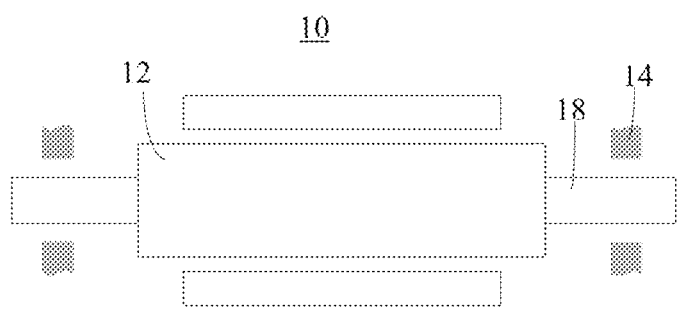
FIG. 1 is a structural schematic diagram illustrating a magnetic bearing according to one embodiment of the present invention.
Figure 2:
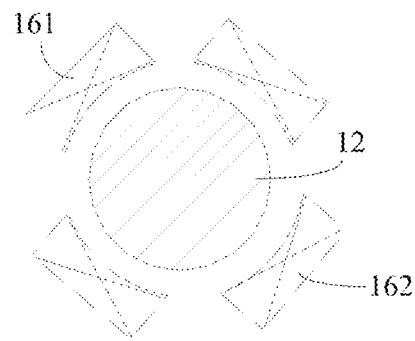
FIG. 2 is a structural schematic diagram illustrating a rotor and a control coil of the magnetic bearing according to one embodiment of the present invention.
Figure 3:
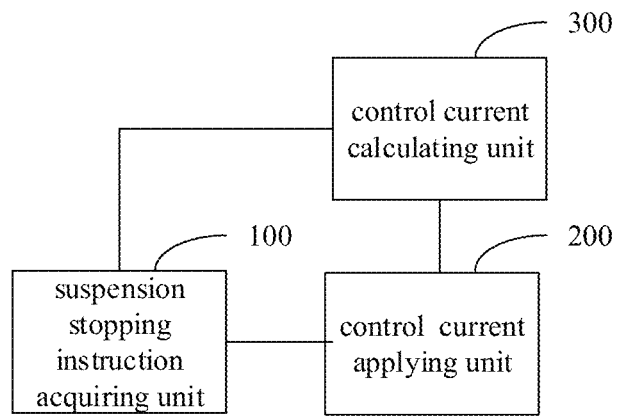
FIG. 3 is a structural schematic diagram illustrating the control device for the magnetic bearing according to one embodiment of the present invention.

Referring to FIGS. 1 to 3, in one embodiment, the control device for a magnetic bearing 10 is configured to control a falling velocity of the rotor 12 to be lower than that of the rotor 12 being subjected only to the gravity when suspension of the magnetic bearing 10 is stopped, thus the control device for the magnetic bearing 10 can reduce the impact of the rotor 12 on the protection bearing 14. The control device for the magnetic bearing 10 of the present disclosure includes a suspension stopping instruction acquiring unit 100 and a control current applying unit 200.

The suspension stopping instruction acquiring unit 100 is configured to acquire a suspension stopping instruction for the magnetic bearing 10.

The suspension stopping instruction acquiring unit 100 may be connected to a controller of the magnetic bearing 10 so as to acquire the suspension stopping instruction for the magnetic bearing 10 when suspension of the magnetic bearing 10 is stopped.

The control current applying unit 200 is configured to apply a control current to one or more control coils 161, 162 of the magnetic bearing 10, respectively, to subject the rotor 12 to a vertically or obliquely upwards electromagnetic force, a vertical component of the electromagnetic force being less than the gravity of the rotor 12.

Wherein the control current is a current applied to the control coil of the magnetic bearing 10. The control current is applied to one or more control coils 161, 162 of the magnetic bearing 10, respectively, to subject the rotor 12 of the magnetic bearing 10 to a vertically or obliquely upwards electromagnetic force, a vertical component of the electromagnetic force being less than the gravity of the rotor 12. Thus the vertical component of the electromagnetic force can balance part of the gravity of the rotor 12, therefore, the falling velocity of the rotor 12 is lower than that of the rotor 12 being subjected only to the gravity, thereby reducing the impact of the rotor 12 on the protection bearing 14.

Preferably, an electromagnetic bearing of the magnetic bearing 10 can be used to convert the control current to an electromagnetic force. However, the present disclosure is not limited thereto, other means can be used to convert the control current to the electromagnetic force.

In the embodiment, the control current is gradually decreased. Thus, it may take less time for the rotor 12 to fall from the suspension stopping position to the protection bearing 14, and the control efficiency is higher.

In one embodiment, the control device for the magnetic bearing 10 further includes a control current calculating unit 300. The control current calculating unit 300 is configured to calculate the desired control current, and send calculation results to the control current applying unit 200, the control current applying unit 200 is configured to apply the control current to the one or more control coils 161, 162 of the magnetic bearing 10, respectively.

Specifically, the control current calculating unit 300 is configured to calculate a value of each control current $I_x$ based on an equation $I_x = P_x \times S + i_x$ until the value of each control current $I_x$ is zero.

Wherein $P_x$ is a slope coefficient for switching each control current $I_x$, $P_x = (0 - i_x)/A$, $i_x$ is an initial value of each control current $I_x$, A is a number of switching times of each control current $I_x$, S is a number of iterations and has an initial value of zero, each control current $I_x$ is switched for every period T, a value of a period timer is n with an initial value of zero, and n is continuously accumulated, when n<T, then S remains constant, when n=T, then S=S+1 and n is cleared, x is an integer greater than or equal to 1. In the embodiment, the number of switching times A of the control current $I_x$, the period T and the initial value $i_x$ of the control current $I_x$ are predetermined as required.

In one specific embodiment, the equation $I_x = P_x \times S + i_x$ is explained in detail by taking the control current $I_1$ as an example, wherein the number of switching times A of the control current $I_1$ is predetermined as 10, the period T is predetermined as 0.1 s, the initial value $i_1$ of the control current $I_1$ is predetermined as 1A, the slope coefficient $P_1 = (0 - i_1)/A = -0.1$.

Step 1: when the number of iterations S=0, then $I_1 = P_1 \times S + i_1 = (-0.1) \times 0 + 1 = 1$;

Step 2: the value n of the period timer is accumulated over time from the initial value 0, when n is accumulated to 0.1 which is the predetermined value of the period T, the number of iterations S=S+1=1, and the value n of the period timer is cleared, then $I_1 = P_1 \times S + i_1 = (-0.1) \times 1 + 1 = 0.9$, the control current $I_1$ is switched from 1 A to 0.9A;

Step 3: the value n of the period timer is accumulated over time from the initial value 0, when n is accumulated to 0.1 which is the predetermined value of the period T, the number of iterations S=S+1=2, and the value n of the period timer is cleared, then $I_1 = P_1 \times S + i_1 = (-0.1) \times 2 + 1 = 0.8$, the control current $I_1$ is switched from 0.9A to 0.8A;

Continuing until Step 11 (the 11$^{th}$ step): the value n of the period timer is accumulated over time from the initial value 0, when n is accumulated to 0.1 which is the predetermined value of the period T, the number of iterations S=S+1=10, and the value n of the period timer is cleared, then $I_1=P_1\times S+i_1=(-0.1)\times 10+1=0$, the control current $I_1$ is switched from 0.1A to 0A.

The above procedure just explains the equation $I_x=P_x\times S+i_x$ in detail with the control current $I_1$ taken as an example. Specific values of each parameter are merely examples for illustration and are not meant to limit the protection scope of the present invention. The scope of the present invention shall be subject to the claims attached. In addition, the calculation procedures for other control currents $I_x$ are the same as that for the control current $I_1$, and will not be repeated herein.

It will be appreciated that if the magnitudes of the control currents, which are applied to one or more control coils 161, 162 of the magnetic bearing 10, respectively, remain constant, a vertical resultant force acting on the rotor 12 would remain constant, the whole falling process of the rotor 12 would take longer time, and the power consumption for controlling the falling process would be higher. During the falling process of the rotor 12, the distance between the rotor 12 and the protection bearing 14 gradually decreases, by applying the control currents which are gradually decreased, the vertical resultant force of the rotor 12 can gradually increase, thus the falling process of the rotor 12 takes less time, thereby reducing the power consumption for controlling the falling process. Moreover, since the gap between the rotor 12 and the protection bearing 14 becomes minimal during the falling process, the impact force of the rotor 12 acting on the protection bearing 14 would not be high. Furthermore, since the control currents are gradually decreased according to the slope coefficient $P_x$, the falling process of the rotor 12 has no significant fluctuation, the control effect is better. Of course, the vertical resultant force of the rotor 12 remains less than the gravity of the rotor 12.

Of course, the present disclosure is not limited to calculating the control currents based on the above-mentioned equation, other methods are possible as long as the calculated currents can realize that the falling velocity of the rotor 12 is less than that of the rotor 12 being subjected only to the gravity and the falling time is shorter. For example, the slope coefficient $P_x$ can be calculated based on other equations, or the control currents are nonlinearly and gradually decreased.

Preferably, control currents can be applied to two control coils 161, 162 of the magnetic bearing 10, respectively. The two control coils 161, 162 are a first control coil 161 and a second control coil 162, the first control coil 161 and the second control coil 162 are symmetrical with respect to the vertical line passing through a center of a shaft 18 of the rotor 12. The control current applied to the first control coil 161 subjects the rotor 12 to a first electromagnetic force, the control current applied to the second control coil 162 subjects the rotor 12 to a second electromagnetic force, a resultant force of the first electromagnetic force and the second electromagnetic force is the electromagnetic force.

Figure 4:
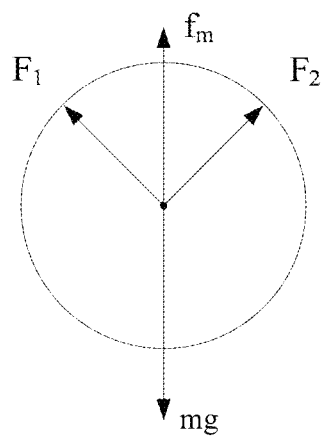
FIG. 4 is a schematic diagram illustrating the forces acting on the rotor of the magnetic bearing according to one embodiment of the present invention.

In the embodiment, the control currents are applied to the first control coil 161 and the second control coil 162 of the magnetic bearing 10, respectively, the first control coil 161 and the second control coil 162 are symmetrical with respect to the vertical line passing through the shaft center of the rotor 12. Referring to FIG. 4, the direction of the first electromagnetic force is defined as a direction pointing from the shaft center of the rotor 12 towards the first control coil 161, an angle between the direction of the first electromagnetic force and the gravitational direction of the rotor 12 is more than 90°, and less than or equal to 180°. Similarly, the direction of the second electromagnetic force is defined as a direction pointing from the shaft center of the rotor 12 towards the second control coil 162, the angle between the direction of the second electromagnetic force and the gravitational direction of the rotor 12 is more than 90°, and less than or equal to 180°.

As shown in FIG. 4, $F_1$ is the first electromagnetic force, $F_2$ is the second electromagnetic force, $f_m$ is the vertical component of the resultant force of the first electromagnetic force and the second electromagnetic force. By respectively applying control currents to two control coils 161, 162 of the magnetic bearing 10 which are systematic with respect to the vertical line passing through the shaft center of the rotor 12, the falling process of the rotor 12 can be better controlled with higher control efficiency.

Further, the control currents applied to the first control coil 161 and the second control coil 162 can have the same magnitude. The control currents applied to the first control coil 161 and the second control coil 162 subject the rotor 12 to the first electromagnetic force and the second electromagnetic force, respectively, and the resultant force of the first electromagnetic force and the second electromagnetic force is vertically upwards and less than the gravity force. In this way, the rotor 12 can fall vertically with no skew and the control efficiency is higher.

In addition, a balancing current can be calculated by a simulation system of the magnetic bearing system to balance the gravity of the rotor 12 itself. Wherein the sum of the magnitudes of the control currents applied to one or more control coils 161, 162 of the magnetic bearing 10 can be less than the magnitude of the balancing current.

The above control device for the magnetic bearing 10 applies a control current to one or more control coils 161, 162 of the magnetic bearing 10, respectively, the control current subjects the rotor 12 to an electromagnetic force, a vertical component of the electromagnetic force can balance part of the gravity of the rotor 12, thus the falling velocity of the rotor 12 is lower than that of the rotor 12 being subjected only to the gravity, the impact of the rotor 12 on the protection bearing 14 can be reduced. Therefore, the above control device allows the falling velocity of the rotor 12 to be lower than that of the rotor 12 being subjected only to the gravity, reduces the impact of the rotor 12 on the protection bearing 14, and has higher control efficiency.

Figure 5:
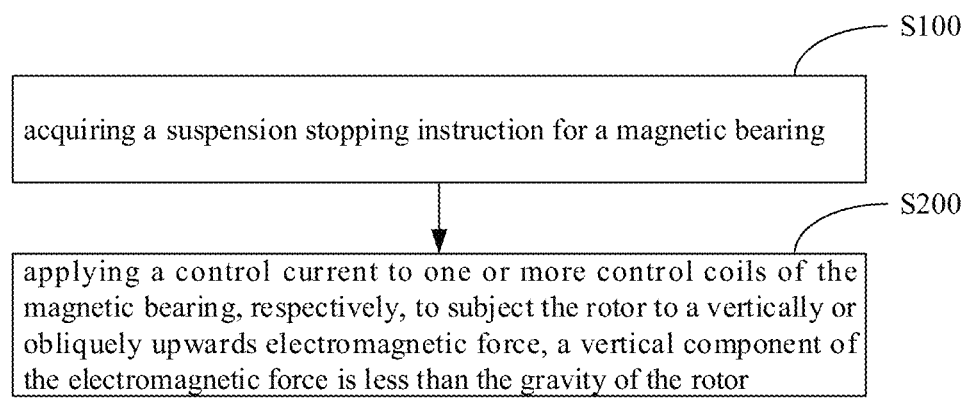
FIG. 5 is a flow chart illustrating the control method for the magnetic bearing according to one embodiment of the present invention.

Under the same inventive concept, the present disclosure provides a control method for a magnetic bearing 10. The control method can control the falling velocity of the rotor 12 to be lower than that of the rotor 12 being subjected only to the gravity when suspension of the magnetic bearing 10 is stopped, so as to reduce the impact of the rotor 12 on the protection bearing 14. Referring to FIG. 5, in one embodiment, the control method for the magnetic bearing 10 of the present disclosure includes following steps:

S100, acquiring a suspension stopping instruction for the magnetic bearing 10.

Wherein the suspension stopping instruction can be acquired by the suspension stopping instruction acquiring unit 100; the suspension stopping instruction acquiring unit 100 may be connected to a controller of the magnetic bearing 10 so as to acquire the suspension stopping instruction for the magnetic bearing 10 when suspension of the magnetic bearing 10 is stopped;

S200, respectively applying a control current to one or more control coils 161, 162 of the magnetic bearing 10 to subject the rotor 12 to a vertically or obliquely upwards electromagnetic force, a vertical component of the electromagnetic force is less than the gravity of the rotor 12.

Wherein the control current is a current applied to the control coil of the magnetic bearing 10. The control current is applied to one or more control coils 161, 162 of the magnetic bearing 10, respectively, to subject a rotor 12 of the magnetic bearing 10 to a vertically or obliquely upwards electromagnetic force, a vertical component of the electromagnetic force is less than the gravity of the rotor 12. Thus the vertical component of the electromagnetic force acting on the rotor 12 can balance part of the gravity of the rotor 12, therefore, the falling velocity of the rotor 12 is lower than that of the rotor 12 being subjected only to the by gravity, thereby reducing the impact of the rotor 12 on the protection bearing 14.

Preferably, an electromagnetic bearing of the magnetic bearing 10 can be used to convert a control current to the electromagnetic force. However, the present disclosure is not limited thereto, other means can be used to convert the control current to the electromagnetic force.

In the embodiment, the control current is gradually decreased. Thus, it may take less time for the rotor 12 to fall from the suspension stopping position to the protection bearing 14, and the control efficiency is higher.

In one embodiment, a value of each control current $I_x$ is calculated based on an equation $I_x=P_x \times S+i_x$ until the value of each control current $I_x$ is zero.

Wherein $P_x$ is a slope coefficient for switching each control current $I_x$, $P_x=(0-i_x)/A$, $i_x$ is an initial value of each control current $I_x$, A is a number of switching times of each control current $I_x$, S is a number of iterations and has an initial value of zero, each control current $I_x$ is switched for every period T, a value of a period timer is n with an initial value of zero, and n is continuously accumulated, when n<T, then S remains constant, when n=T, then S=S+1 and n is cleared, x is an integer greater than or equal to 1. In the embodiments, the number of switching times A of the control current $I_x$, the period T and the initial value $i_x$ of the control current $I_x$ are predetermined as required.

In one specific embodiment, the equation $I_x=P_x \times S+i_x$ is explained in detail by taking the control current $I_1$ as an example, wherein the number of switching times A of the control current $I_1$ is predetermined as 10, the period T is predetermined as 0.1 s, the initial value $i_1$ of the control current $I_1$ is predetermined as 1A, the slope coefficient $P_1=(0-i_1)/A=-0.1$.

Step 1: when the number of iterations S=0, then $I_1=P_1 \times S+i_1=(-0.1) \times 0+1=1$;

Step 2: the value n of the period timer is accumulated over time from the initial value 0, when n is accumulated to 0.1 which is the predetermined value of the period T, the number of iterations S=S+1=1, and the value n of the period timer is cleared, then $I_1=P_1 \times S+i_1=(-0.1) \times 1+1=0.9$, the control current $I_1$ is switched from 1 A to 0.9A;

Step 3: the value n of the period timer is accumulated over time from the initial value 0, when n is accumulated to 0.1 which is the predetermined value of the period T, the number of iterations S=S+1=2, and the value n of the period timer is cleared, then $I_1=P_1 \times S+i_1=(-0.1) \times 2+1=0.8$, the control current $I_1$ is switched from 0.9A to 0.8A;

Continuing until Step 11: the value n of the period timer is accumulated over time from the initial value 0, when n is accumulated to 0.1 which is the predetermined value of the period T, the number of iterations S=S+1=10, and the value n of the period timer is cleared, then $I_1=P_1 \times S+i_1=(-0.1) \times 10+1=0$, the control current $I_1$ is switched from 0.1A to 0A.

The above procedure just explains the equation $I_x=P_x \times S+i_x$ in detail with the control current $I_1$ taken as an example. Specific values of each parameter are merely examples for illustration and are not meant to limit protection scope of the present disclosure. The scope of the present disclosure shall be subject to the claims attached. In addition, the calculation procedures of other control currents $I_x$ are the same as that of the control current $I_1$, and will not repeated herein.

It will be appreciated that if the magnitudes of the control currents, which are applied to one or more control coils 161, 162 of the magnetic bearing 10, respectively, remain constant, a vertical resultant force acting on the rotor 12 would remain constant, the whole falling process of the rotor 12 would take longer time, the power consumption for controlling the falling process would be higher. During the falling process of the rotor 12, the distance between the rotor 12 and the protection bearing 14 gradually decreases, by applying the control currents which are gradually decreased, the vertical resultant force of the rotor 12 can gradually increase, the falling process of the rotor 12 takes less time, thereby reducing the power consumption for controlling the falling process. Moreover, since the gap between the rotor 12 and the protection bearing 14 becomes minimal during the falling process, the impact force of the rotor 12 acting on the protection bearing 14 would not be high. Furthermore, the control currents are gradually decreased according to the slope coefficient $P_x$, the falling process of the rotor 12 has no significant fluctuation, the control effect is better. Of course, the vertical resultant force of the rotor 12 remains less than the gravity of the rotor 12.

Of course, the present disclosure is not limited to calculating the control currents based on the above-mentioned equation as long as the calculated currents can realize that the falling velocity of the rotor 12 is less than that of the rotor 12 being subjected only to the gravity and the falling time is shorter. For example, the slope coefficient $P_x$ can be calculated based on other equations, or the control currents are nonlinearly and gradually decreased.

Preferably, the control currents can be applied to two control coils 161, 162 of the magnetic bearing 10, respectively. The two control coils 161, 162 are a first control coil 161 and a second control coil 162, the first control coil 161 and the second control coil 162 are symmetrical with respect to the vertical line passing through the shaft center of the rotor 12. The control current applied to the first control coil 161 subjects the rotor 12 to a first electromagnetic force, the control current applied to the second control coil 162 subjects the rotor 12 to a second electromagnetic force, a resultant force of the first electromagnetic force and the second electromagnetic force is the electromagnetic force.

In the embodiment, the control currents are applied to the first control coil 161 and the second control coil 162 of the magnetic bearing 10 respectively, the first control coil 161 and the second control coil 162 are symmetrical with respect to the vertical line passing through the shaft center of the rotor 12. Referring to FIG. 4, the direction of the first electromagnetic force is defined as a direction pointing from the shaft center of the rotor 12 towards the first control coil 161, an angle between the direction of the first electromagnetic force and the gravitational direction of the rotor 12 is more than 90°, and less than or equal to 180°. Similarly, the direction of the second electromagnetic force is defined as a direction pointing from the shaft center of the rotor 12 towards the second control coil 162, the angle between the direction of the second electromagnetic force and the gravitational direction of the rotor 12 is more than 90°, and less than or equal to 180°.

As shown in FIG. 4, $F_1$ is the first electromagnetic force, $F_2$ is the second electromagnetic force, $f_m$ is the vertical component of the resultant force of the first electromagnetic force and the second electromagnetic force. By respectively applying control currents to two control coils 161, 162 of the magnetic bearing 10 which are systematic with respect to the vertical line passing through the shaft center of the rotor 12, the falling process of the rotor 12 can be better controlled with higher control efficiency.

Further, the control currents applied to the first control coil 161 and the second control coil 162 can have the same magnitude. Thus, the control currents applied to the first control coil 161 and the second control coil 162 subject the rotor 12 to a first electromagnetic force and a second electromagnetic force, respectively, and the resultant force of the first electromagnetic force and the second electromagnetic force is vertically upwards. In this way, the rotor 12 can fall vertically with no skew, and the control efficiency is higher.

In addition, a balancing current can be calculated by a simulation system of the magnetic bearing system to balance the gravity of the rotor 12. Wherein the sum of the magnitudes of the control currents applied to one or more control coils 161, 162 of the magnetic bearing Ifs can be less than the magnitude of the balancing current.

The above control method for the magnetic bearing 10 applies a control current to one or more control coils 161, 162 of the magnetic bearing 10, respectively, the control current subjects the rotor 12 to an electromagnetic force, a vertical component of the electromagnetic force can balance part of the gravity of the rotor 12, thus the falling velocity of the rotor 12 is lower than that of the rotor 12 being subjected only to the gravity, the impact of the rotor 12 on the protection bearing 14 can be reduced. Therefore, the above control method allows the falling velocity of the rotor 12 to be lower than that of the rotor 12 being subjected only to the gravity, reduces the impact of the rotor 12 on the protection bearing 14, and has higher control efficiency.

What described above are several embodiments of the present disclosure, they are relatively concrete and detailed, but they are not intended to limit the scope of the present invention. It will be understood by those skilled in the art that various modifications and improvements can be made without departing from the conception of the present disclosure, and all these modifications and improvements are within the scope of the present invention. The scope of the present invention shall be subject to the claims attached.

What is claimed is:

1. A control method for a magnetic bearing, comprising following steps:
   acquiring a suspension stopping instruction for the magnetic bearing, and
   applying a control current to a control coil of the magnetic bearing to subject a rotor of the magnetic bearing to a vertically or obliquely upwards electromagnetic force, a vertical component of the electromagnetic force is less than the gravity of the rotor;
   wherein the control current is gradually decreased to allow a vertical resultant force exerted on the rotor to be gradually increased.

2. The control method of claim 1, wherein a value of each control current Ix is calculated based on an equation $Ix=Px \times S+ix$ until the value of each control current Ix is zero;
   wherein Px is a slope coefficient of switching each control current Ix, $Px=(0-ix)/A$, ix is an initial value of each control current Ix, A is a number of switching times of each control current Ix, S is a number of iterations and has an initial value of zero, each control current Ix is switched for every period T, a value of a period timer is n with an initial value of zero, and n is continuously accumulated, when n<T, S remains constant, when n=T, then S=S+1 and n is cleared, x is an integer greater than or equal to 1.

3. The control method of claim 2, wherein the step of applying a control current to a control coil of the magnetic bearing includes applying control currents to two control coils of the magnetic bearing, respectively;
   the two control coils are a first coil and a second coil, the first coil and the second coil are symmetrical with respect to the vertical line passing through a shaft center of the rotor;
   the control current applied to the first control coil subjects the rotor to a first electromagnetic force, the control current applied to the second control coil subjects the rotor to a second electromagnetic force, a resultant force of the first electromagnetic force and the second electromagnetic force is the electromagnetic force.

4. The control method of claim 3, wherein the control currents applied to the first control coil and the second control coil have the same magnitude.

5. The control method of claim 1, wherein the step of applying a control current to a control coil of the magnetic bearing includes applying control currents to two control coils of the magnetic bearing, respectively;
   the two control coils are a first coil and a second coil, the first coil and the second coil are symmetrical with respect to the vertical line passing through a shaft center of the rotor; the control current applied to the first control coil subjects the rotor to a first electromagnetic force, the control current applied to the second control coil subjects the rotor to a second electromagnetic force, a resultant force of the first electromagnetic force and the second electromagnetic force is the electromagnetic force.

6. The control method of claim 5, wherein the control currents applied to the first control coil and the second control coil have the same magnitude.

7. The control method of claim 5, wherein an angle between a direction of the first electromagnetic force and a gravitational direction of the rotor is more than 90°, and less than or equal to 180°, an angle between a direction of the second electromagnetic force and the gravitational direction of the rotor is more than 90°, and less than or equal to 180°.

8. The control method of claim 1, wherein the step of applying a control current to a control coil of the magnetic bearing includes applying control currents to two control coils of the magnetic bearing, respectively;
   the two control coils are a first coil and a second coil, the first coil and the second coil are symmetrical with respect to the vertical line passing through a shaft center of the rotor;
   the control current applied to the first control coil subjects the rotor to a first electromagnetic force, the control current applied to the second control coil subjects the rotor to a second electromagnetic force, a resultant force of the first electromagnetic force and the second electromagnetic force is the electromagnetic force.

9. The control method of claim 8, wherein the control currents applied to the first control coil and the second control coil have the same magnitude.

10. A control device for a magnetic bearing, comprising a suspension stopping instruction acquiring unit and a control current applying unit;

the suspension stopping instruction acquiring unit is configured to acquire a suspension stopping instruction for the magnetic bearing;

the control current applying unit is configured to apply a control current to one or more control coils of the magnetic bearing, respectively, to subject the rotor to a vertically or obliquely upwards electromagnetic force, a vertical component of the electromagnetic force is less than gravity of the rotor;

wherein the control current is gradually decreased to allow a vertical resultant force exerted on the rotor to be gradually increased.

11. The control device of claim 10, wherein the control device further comprises a control current calculating unit, the control current calculating unit is configured to calculate the control current, and send calculation results to the control current applying unit, the control current applying unit is configured to apply the control current to the one or more control coils of the magnetic bearing, respectively;

the control current calculating unit is configured to calculate a value of each control current h based on an equation $I_x=P_x \times S+i_x$ until the value of each control current Ix is zero;

wherein $P_x$ is a slope coefficient for switching each control current $I_x$, $P_x=(0-i_x)/A$, $i_x$ is an initial value of each control current $I_x$, A is a number of switching times of each control current $I_x$, S is a number of iterations and has an initial value of zero, each control current $I_x$ is switched for every period T, a value of a period timer is n with an initial value of zero, and n is continuously accumulated, when n<T, S remains constant, when n=T, then S=S+1 and n is cleared, x is an integer greater than or equal to 1.

12. The control device of claim 11, wherein the control currents are applied to two control coils of the magnetic bearing, respectively, the two control coils are a first coil and a second coil, the first coil and the second coil are symmetrical with respect to the vertical line passing through the shaft center of the rotor; the control current applied to the first control coil subjects the rotor to a first electromagnetic force, the control current applied to the second control coil subjects the rotor to a second electromagnetic force, a resultant force of the first electromagnetic force and the second electromagnetic force is the electromagnetic force.

13. The control device of claim 12, wherein the control currents applied to the first control coil and the second control coil have the same magnitude.

14. The control device of claim 10, wherein the control currents are applied to two control coils of the magnetic bearing, respectively, the two control coils are a first coil and a second coil, the first coil and the second coil are symmetrical with respect to the vertical line passing through the shaft center of the rotor; the control current applied to the first control coil subjects the rotor to a first electromagnetic force, the control current applied to the second control coil subjects the rotor to a second electromagnetic force, a resultant force of the first electromagnetic force and the second electromagnetic force is the electromagnetic force.

15. The control device of claim 14, wherein the control currents applied to the first control coil and the second control coil have the same magnitude.

16. The control device of claim 14, wherein an angle between a direction of the first electromagnetic force and a gravitational direction of the rotor is more than 90°, and less than or equal to 180°, an angle between a direction of the second electromagnetic force and the gravitational direction of the rotor is more than 90°, and less than or equal to 180°.

17. The control device of claim 10, wherein the control currents are applied to two control coils of the magnetic bearing, respectively, the two control coils are a first coil and a second coil, the first coil and the second coil are symmetrical with respect to the vertical line passing through the shaft center of the rotor;

the control current applied to the first control coil subjects the rotor to a first electromagnetic force, the control current applied to the second control coil subjects the rotor to a second electromagnetic force, a resultant force of the first electromagnetic force and the second electromagnetic force is the electromagnetic force.

18. The control device of claim 17, wherein the control currents applied to the first control coil and the second control coil have the same magnitude.

\* \* \* \* \*